United States Patent

Inoue

[19]

[11] Patent Number: 5,881,045
[45] Date of Patent: *Mar. 9, 1999

[54] COMPACT CHANGER-TYPE DISK PLAYER

[75] Inventor: Yoshihisa Inoue, Saitamaken, Japan

[73] Assignee: Nakamichi Corp., Japan

[*] Notice: This patent issued on a continued prosecution application filed under 37 CFR 1.53(d), and is subject to the twenty year patent term provisions of 35 U.S.C. 154(a)(2).

[21] Appl. No.: 710,065

[22] Filed: Sep. 10, 1996

Related U.S. Application Data

[63] Continuation of Ser. No. 293,902, Aug. 23, 1994, abandoned.

[30] Foreign Application Priority Data

Aug. 23, 1993 [JP] Japan .................................... 5-228242
Aug. 23, 1993 [JP] Japan .................................... 5-228243

[51] Int. Cl.⁶ .......................... G11B 17/04; G11B 17/22; G11B 33/02
[52] U.S. Cl. ............................ 369/192; 369/36; 369/77.1
[58] Field of Search .................................... 369/192, 191, 369/34, 36, 178, 37, 38, 39, 258, 197, 204, 75.1, 75.2, 264, 77.1–77.2; 360/98.01–98.08, 99.08

[56] References Cited

U.S. PATENT DOCUMENTS

| 4,539,671 | 9/1985 | Higashihara | 369/75.1 |
| 4,782,473 | 11/1988 | Masaki | 369/36 |
| 5,123,001 | 6/1992 | Nakamichi et al. | 369/36 |
| 5,130,959 | 7/1992 | Wakatsuki et al. | 369/36 |
| 5,544,148 | 8/1996 | Nakamichi | 369/192 |
| 5,561,658 | 10/1996 | Nakamichi et al. | 369/267 |

FOREIGN PATENT DOCUMENTS

| 63-204548 | 8/1988 | Japan | 369/191 |
| 02143942 | 6/1990 | Japan . | |

*Primary Examiner*—Allen T. Cao
*Attorney, Agent, or Firm*—Morrison Law Firm

[57] ABSTRACT

A disk player has a disk drive mechanism with rollers engaging a perimeter surfaces of a disk. Two rollers engage an upper surface and two roller engage a lower surface. One of the rollers is coupled to a drive source to rotate the disk. Disks are transported upon carriages which are stored in a magazine. The center of each disk is supported upon an idler turntable disposed on a carriage. A selected carriage is moved by a transport mechanism from the magazine to place a disk thereon engagement with the rollers. The upper two rollers bias the center aperture of the disk downward upon the idler turntable as the two lower rollers act as pivots. A stable triangular region of support thus is defined by the two lower rollers and the idler turntable. An optical head is mounted in a fixed position within the chassis and the rollers and turntable are moved to advance the disk over the optical head for scanning. The disk is rotatable by the disk drive mechanism while the center aperture thereof overlaps other disks in the magazine thus allowing a compact configuration to be achieved. The transport mechanism also transports the selected to an eject position for loading and unloading.

59 Claims, 12 Drawing Sheets

COMPACT CHANGER-TYPE DISK PLAYER

This applications is a continuation of application Ser. No. 08/293,902, filed Aug. 23, 1994, now abandoned.

BACKGROUND OF THE INVENTION

The present invention relates to a CD player and, more particularly, to a CD player having a stabilizing disk driver mechanism and an optical scanning mechanism having a fixed position optical head. The CD player also incorporates a magazine for holding a plurality of disks. The configuration of the disk driver and optical scanning mechanism permits a compact CD changer size to be achieved, which conforms to DIN dashboard cavity dimensions while providing magazine operation.

Automobiles are presently equipped with dashboard cavities for audio devices with dimensions (182 mm wide, 53 mm high) conforming to a DIN standard (ISO 7736). While these dimensions are sufficient for radios, cassette decks and single CD players, they are insufficient for presently available CD changers. As a result, automotive CD changers must be mounted in a trunk area and connected to a dash mounted controller. Such an arrangement requires additional labor to run connections between the trunk and dash. Furthermore, locating the CD changer in the trunk makes exchanging disks inconvenient. Therefore, there exists a need for an in-dash CD changer that can be installed in DIN standard dashboard cavities.

Primary design considerations determining the compactness of a CD changer include the relationship between playback and storage positions and the construction of the optical scanning mechanism. Japanese laid-open patent publication 2-143942 discloses a device wherein the playback and storage positions of a disk overlap while centers of each position are diagonally opposed within a chassis of the CD changer. Similarly, Japanese laid-open patent publication 3-201259 discloses a device having overlapping storage and playback positions aligned along a centerline of the device. Each of these devices includes an optical head transported along a diagonal of the chassis. Other dash mounted CD players include those disclosed in Japanese patent publication 2-6151 and Japanese patent publication 4-62157, wherein the optical head also moves along an axis inclined relative to the sides of the device.

Each of the above referenced devices has a turntable upon which the disks are rotated during playing. Since the disk is supported solely at its center during the playing, the disk is subject to vibrations and resonances which interfere with the reading of the disk. Such disturbances require that the optical servo focus mechanism operate over a sufficient range to provide compensation. However, not all disturbances can be compensated for and sound quality is degraded as a result of erroneously read data and amplification of the focus servo signal.

Disk reader configurations for reducing vibrations and resonance have been attempted. A Japanese laid-open utility model publication 57-138175 shows a device wherein a disk is supported on a turntable and pressed between drive and idler rollers engaging recorded medium and label surfaces of the disk. The rollers are mounted in conjunction with the optical head and move with the optical head as the disk is scanned. Roller contact is thus maintained in close proximity to a scanning point. Support of the disk at both the center aperture and the rollers limits disk vibrations and resonance at the scanning point. However, the contact made by the rollers with the recorded medium and the label surfaces results in these surfaces becoming damaged. Damage to the label is unsightly and damage to the recorded medium results in erroneous data being read and a consequential loss of sound quality. Furthermore, the disk is supported along a single axis defined by the turntable center and points of contact made by the rollers. The linear support is subject to pivoting type vibrations and resonances.

Further size constraints are encountered in the design of the disk drivers used to rotate the disks during playing. Typically, the disks are rotated by turntables engaging center apertures of the disks. The turntables in the above devices are driven by motors coupled beneath the turntables. Thus, disks must be removed from a storage location a sufficient distance to provide clearance for the turntable to access the center apertures of the disks. Since the turntables are driven by drive motors or drive trains substantially in line with the turntable, the center aperture of a disk being played cannot overlap the other disks held in storage. Therefore, devices having such a turntable drive arrangement must have sufficient dimensions to allow this clearance to be achieved. This necessitates that the center aperture clear disks in the magazine.

In each of the above devices, the compactness of the devices is limited by the space occupied by mechanisms for actuating the optical head, clearance requirements of the disk drive mechanisms, and circuit boards for controlling the mechanisms. Thus, the number of disks held by the devices can not be increased and the depth dimensions of the devices can not be decreased. The depth requirements excluded the possibility of providing a CD changer compatible with the above reference DIN dimensions.

OBJECTS AND SUMMARY OF THE INVENTION

Accordingly, it is an object of the invention to provide a disk player which overcomes the drawbacks of the prior art. In particular, an object of the invention is to provide a compact size disk changer with improved stability of operation.

It is a further object of the invention to provide a disk changer capable of being mounted in a standard DIN dimension dashboard cavity.

It is a still further object of the invention to provide an improved disk drive mechanism for dampening vibrations and reducing resonances to enhance the quality of data recovery from a disk.

It is yet another object of the invention to provide a disk player requiring fewer parts. In particular an object of the present invention is the elimination of the need for an optical head transport mechanism.

Still another object of the present invention is to provide a disk player with a carriage type transport system allowing use of an edge engaging disk drive while operating with a compact magazine configuration.

Yet another object of the present invention is to provide a disk drive mechanism which does not damage surfaces of disks while providing multi-point stabilization.

A still further object of the invention to provide a magazine and disk reader assembly wherein a disk is displaced from a magazine, for reading, a distance substantially equal to a radial dimension of readable medium on the disk.

Briefly stated, the present invention provides a disk player having a disk drive mechanism with rollers engaging perimeter surfaces of a disk. Two rollers engage an upper surface and two roller engage a lower surface.

Briefly stated, the present invention provides a disk player having a disk drive mechanism with rollers engaging perimeter surfaces of a disk. Two rollers engage an upper surface and two roller engage a lower surface. One of the rollers is coupled to a drive source to rotate the disk. Disks are transported upon carriages which are stored in a magazine. The center of each disk is supported upon an idler turntable disposed on each carriage. A disk on selected carriage is moved by a transport mechanism from the magazine into engagement with the rollers. The upper two rollers bias the center aperture of the disk downward upon the idler turntable as the two lower rollers act as pivots. A stable triangular region of support thus is defined by the two lower rollers and the idler turntable. An optical head is mounted in a fixed position within the chassis and the rollers and turntable are moved to advance the disk over the optical head for scanning. The disk is rotatable by the disk drive mechanism while the center aperture thereof overlaps other disks in the magazine thus allowing a compact configuration to be achieved. The transport mechanism also transports the selected to an eject position for loading and unloading.

In accordance with these and other objects of the invention, there is provided a disk reader comprising: a chassis; a disk reading head for reading information recorded on a disk; means for fixedly mounting the disk reading head to the chassis with respect to a scanning direction; transport means for transporting the disk from an access position for loading and unloading to a read starting position situated above the disk reading head; disk drive means for rotating the disk during scanning by the disk reading head; and the transport means including means for transporting the disk and the disk drive means in plane over the disk reading head to permit reading the information.

The present invention also provides a disk reader comprising: a disk reading head for reading information recorded on a disk; means for scanning the disk reading head across the disk; disk drive means for rotating the disk including first and second rollers for rotatably engaging the disk at first and second contact areas along a fixed circumferential area on a first flat surface of the disk, and rotatable support for engaging the disk at a third contact area permitting the disk to rotate about a center aperture thereof; means for rotating at least one of the first roller, the second roller, and the rotatable support; and the first and second contact areas being located on a first flat surface of the disk, at least a third roller for rotatably engaging a second flat surface of the disk, and means for biasing the third roller against the second flat surface to assert pressure on the rotatable support and the first and second rollers.

According to a feature of the invention, there is further provided a disk reader comprising: a disk reading head for reading information recorded on a disk; means for scanning the disk reading head across the disk; disk drive means for rotating the disk; the disk drive means including means for rotatably supporting the disk at three points of contact defining a triangle within a plane of the disk to effect stabilization of the disk within a region of the triangle; and means for biasing the disk toward the means for rotatably supporting.

The present invention further includes a disk reader comprising: a chassis; a disk reading head for scanning information recorded on a disk; transport means for transporting the disk relative to the chassis at a read starting position, situated above the disk reading head, during scanning of the information; disk drive means for rotating the disk during scanning by the disk reading head.

According to a still further feature of the invention, there is further provided a disk reader comprising: a chassis; a disk reading head for reading information recorded on a disk; means for scanning the disk reading head across the disk; a carriage for carrying the disk; transport means for transporting the disk and carriage relative to the chassis; the carriage including an idler turntable upon which the disk is rotatably supported; and disk drive means for rotating the disk in continuous engagement with a fixed circumferential area on a first flat surface of the disk during scanning to rotate the disk upon the idler turntable.

According to yet another feature of the present invention, there is provided a disk player comprising: a magazine for storing disks; a disk reading head for reading information recorded on the disks; disk drive means for rotating a disk during scanning by the disk reading head; means for effecting relative movement between the magazine and the disk reading head to select the disk from the disks stored in the magazine; and transport means for transporting the disk between a holding position in the magazine and a read starting position, situated above the disk reading head, permitting scanning of the information by movement of the disk over the disk reading head.

According to still another feature of the present invention, there is provided a disk player comprising: a magazine for storing disks; a disk reading head for reading information recorded on a disk selected from the disks; means for scanning the disk with the disk reading head; disk drive means for rotating a disk during scanning by the disk reading head; the disk drive means having an idler turntable engaging a center aperture of the disk and a means for rotating engaging a perimeter of the disk; transport means for transporting the disk between a holding position in the magazine and a read starting position; means for moving the magazine means relative to the disk reading head to select the disk from the disks stored in the magazine; and the disk reading head having a sensing portion for scanning an innermost circumference of a recording surface of the disk while a center aperture of the disk overlaps the disks in the magazine.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
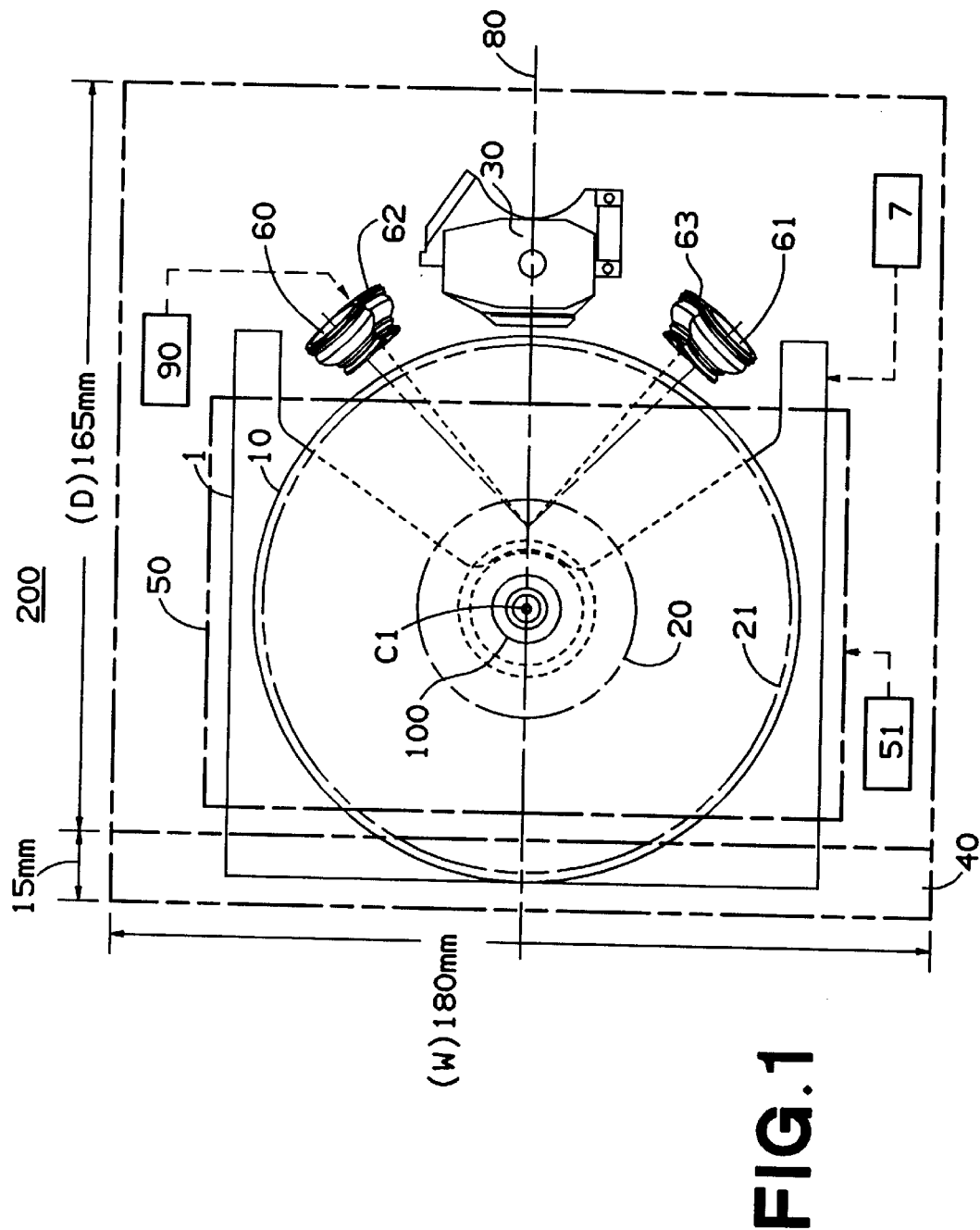
FIG. 1 is a plan view showing an embodiment of a disk changer of present invention with all carriages in a magazine.
Figure 2:
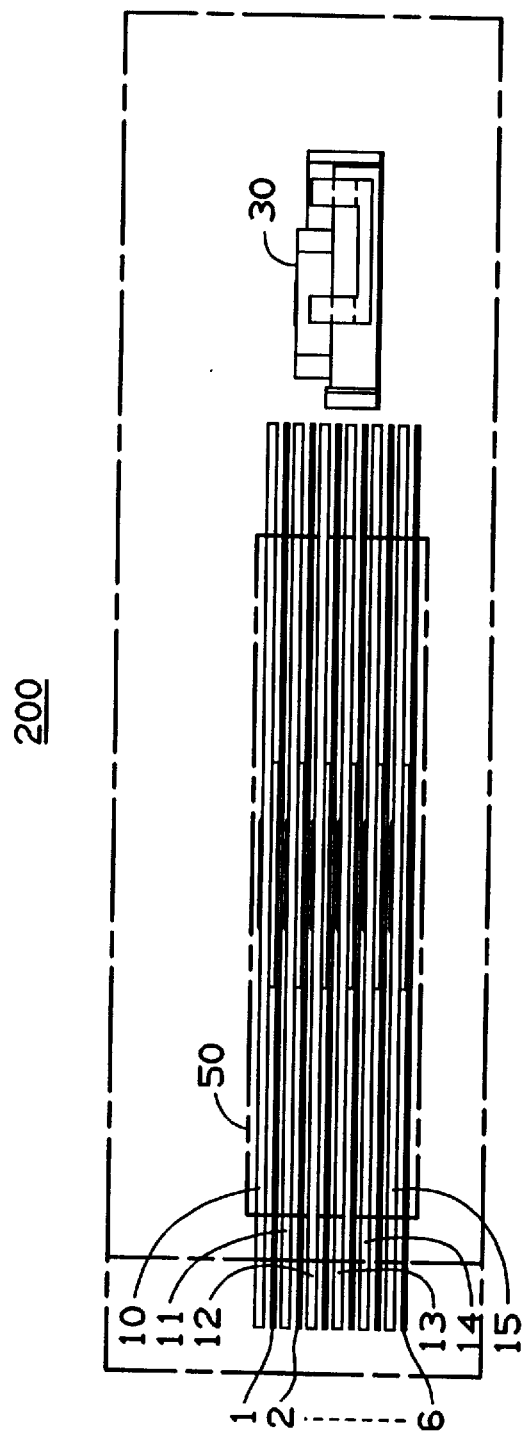
FIG. 2 is a side view of the disk changer of FIG. 1 showing a selected state of an uppermost carriage stored in the magazine.

Referring to FIGS. 1 and 2, a double-dashed chassis outline of an in-dash disk changer 200 of the present invention is shown. The chassis of the disk changer 200 conforms to DIN-standard (ISO7736) dimensions for a dashboard cavity. The chassis dimensions include a width of 180 mm, a height of 50 mm and a depth of 165 mm. A front panel 40 on the front of the chassis has a depth of 15 mm and height and width dimensions equaling those of the chassis. A magazine 50 capable of storing six disks 10–15 on carriages 1–6 is mounted within the chassis. An optical head 30 is fixedly mounted upon a damping mechanism (not shown) within the chassis adjacent the magazine 50 and the disks 10–15 therein. An inner perimeter 20 and an outer perimeter 21 on each disk define boundaries of recorded media on the disks.

The disk changer 200 can selectively play, eject, and store disks held in any of the six carriages 1–6 in the magazine 50. For purposes of example, the operation of the disk changer 200 is described herein with reference to the first disk 10 and carriage 1, however, it is understood that the operations apply to each of the disks 10–15 or carriages 1–6. By convention, the first carriage 1 carrying the first disk 10 is located on the uppermost level of the magazine 50. The sixth carriage 6 is located on the lowermost level of the magazine 50. Although the present embodiment is directed toward use with disks of the form of a COMPACT DISC (Trademark), it is clearly understood, that the present invention is equally applicable to other disk type storage media.

The magazine 50 is movably mounted within the chassis to permit travel along a first axis perpendicular to a surface of the first disk 10. A vertical drive mechanism 51 transports the magazine 50 along the first axis. The vertical drive mechanism 51 selects a carriage in the magazine 50 by aligning a selected carriage with a functional plane of the optical head 30 wherein a disk must lie to be scanned by the optical head 30. The first carriage 1 is shown aligned with the functional plane of the optical disk head 30. Each of the carriages 1–6 has a turntable 100 rotatably mounted thereon upon which the disks 10–15 are supported.

A carriage moving mechanism 7 is disposed to engage the selected carriage in alignment with the functional plane of the optical head 30. Once the selected carriage is engaged, the carriage moving mechanism 7 transports the selected carriage along a second axis perpendicular to the first axis to move the carriage from within the magazine 50 to a position extended from the magazine 50 as illustrated in FIGS. 1 and 2. First through fourth rollers 60–63 are disposed in a rear portion of the disk changer 200 behind the magazine 50 as illustrated. The four rollers 60–63 are positioned to engage a selected disk moved by the carriage moving mechanism 7. A roller drive mechanism 90 is coupled to the third roller 62 to rotate the third roller 62 and a selected disk captured between the first and second rollers, 60 and 61, and the third and fourth rollers, 62 and 63, as discussed below. The carriage moving mechanism 7 moves the selected carriage and disk over the optical head 30 allowing a light beam of the optical head 30 to scan a recording surface of the selected disk.

The optical head 30 is fixed relative to the chassis in the instant embodiment. Motion for scanning the optical head 30 is effected solely by the carriage moving mechanism. However, a movable optical head may also be employed in an embodiment of the present invention wherein the scanning motion is effected by a combination of the carriage moving mechanism 7 and an optical head moving mechanism. The combined motion of both mechanisms adds to produce a differential speed which is the sum in both devices. Access speed to a given location on the selected disk is improved. Alternatively, a movable optical head may be employed in combination with features of the present invention.

Figure 3:
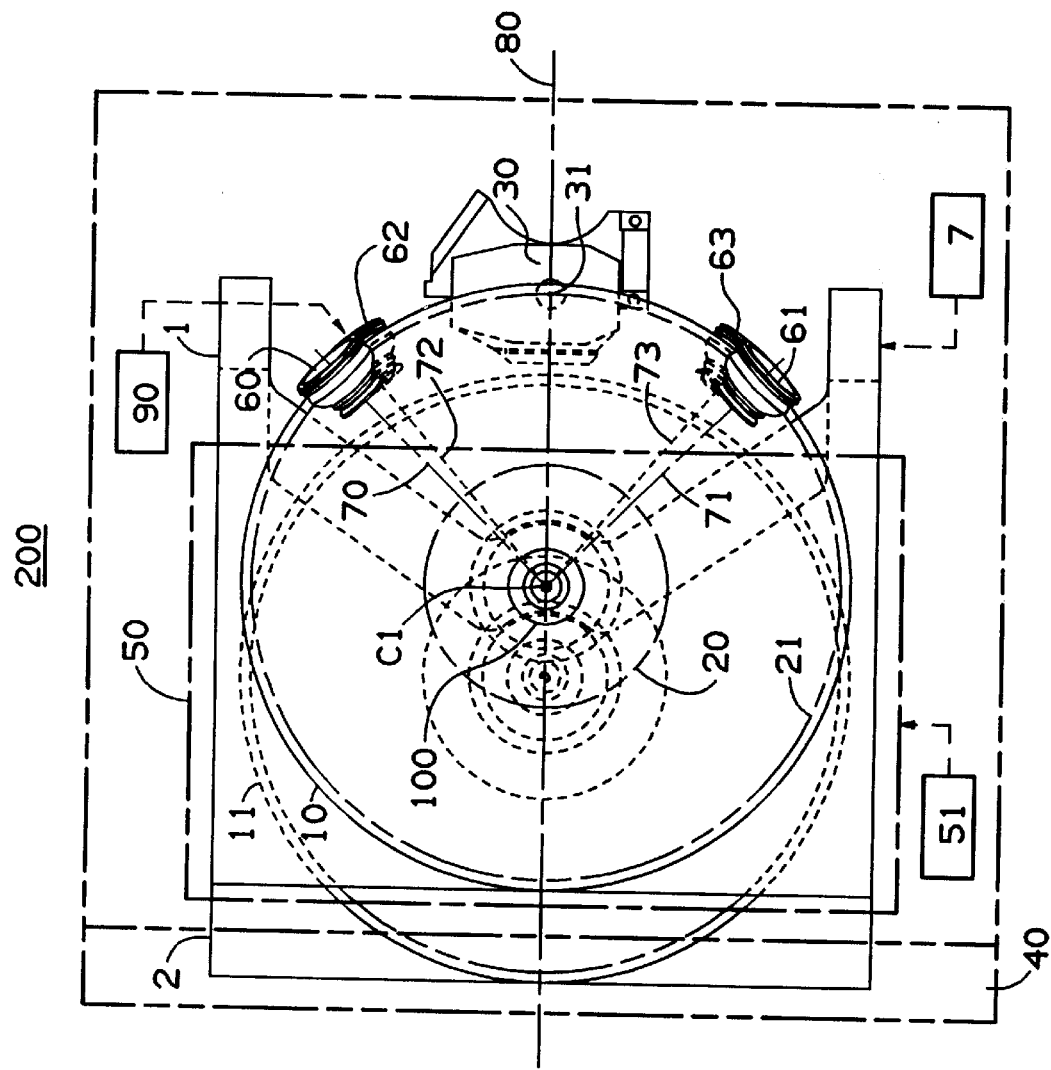
FIG. 3 is a plan view of the disk changer of FIG. 1 showing the selected carriage in a playback finishing position.
Figure 4:
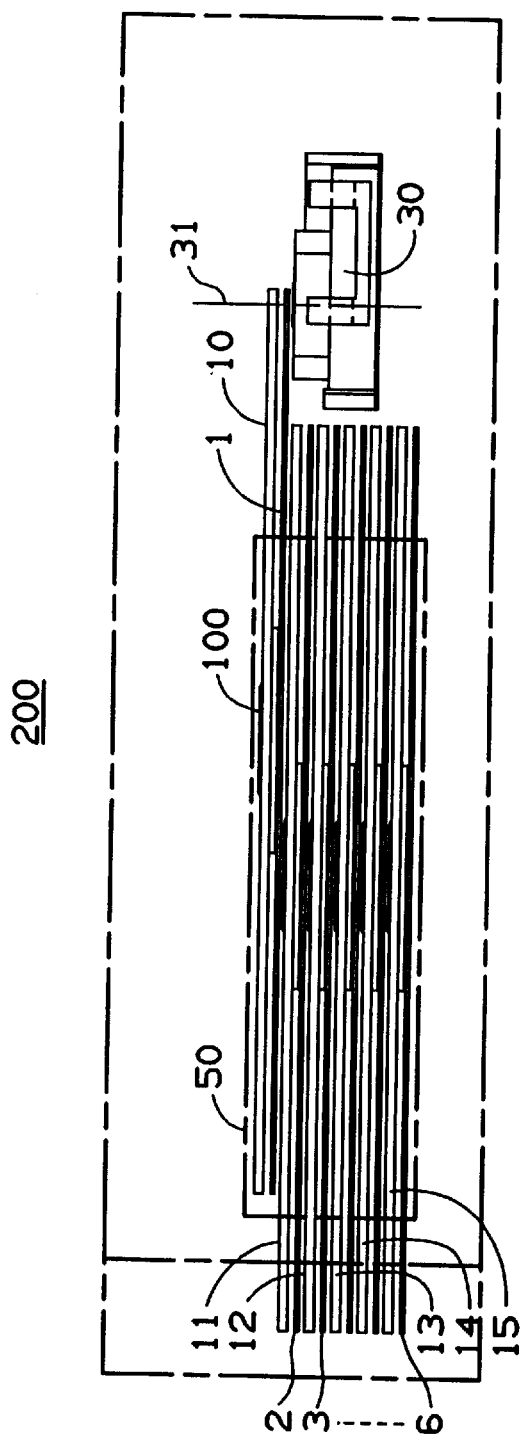
FIG. 4 is a side view of the disk changer of FIG. 1 showing the selected carriage in a playback finishing position.

Referring to FIGS. 3 and 4, travel of a selected carriage over the optical head 30, is illustrated wherein the first carriage 1 is shown moved to the playback finishing position. The playback finishing position is defined as the position where an axis 31 of the light source of the optical head 30 is at an outermost perimeter 21 of recorded media on the first selected disk 10. The four rollers 60–63 initially engage the selected disk at the playback finishing position. From this position, the carriage driving mechanism continues to move the selected carriage to the right toward a playback starting position.

Figure 5:
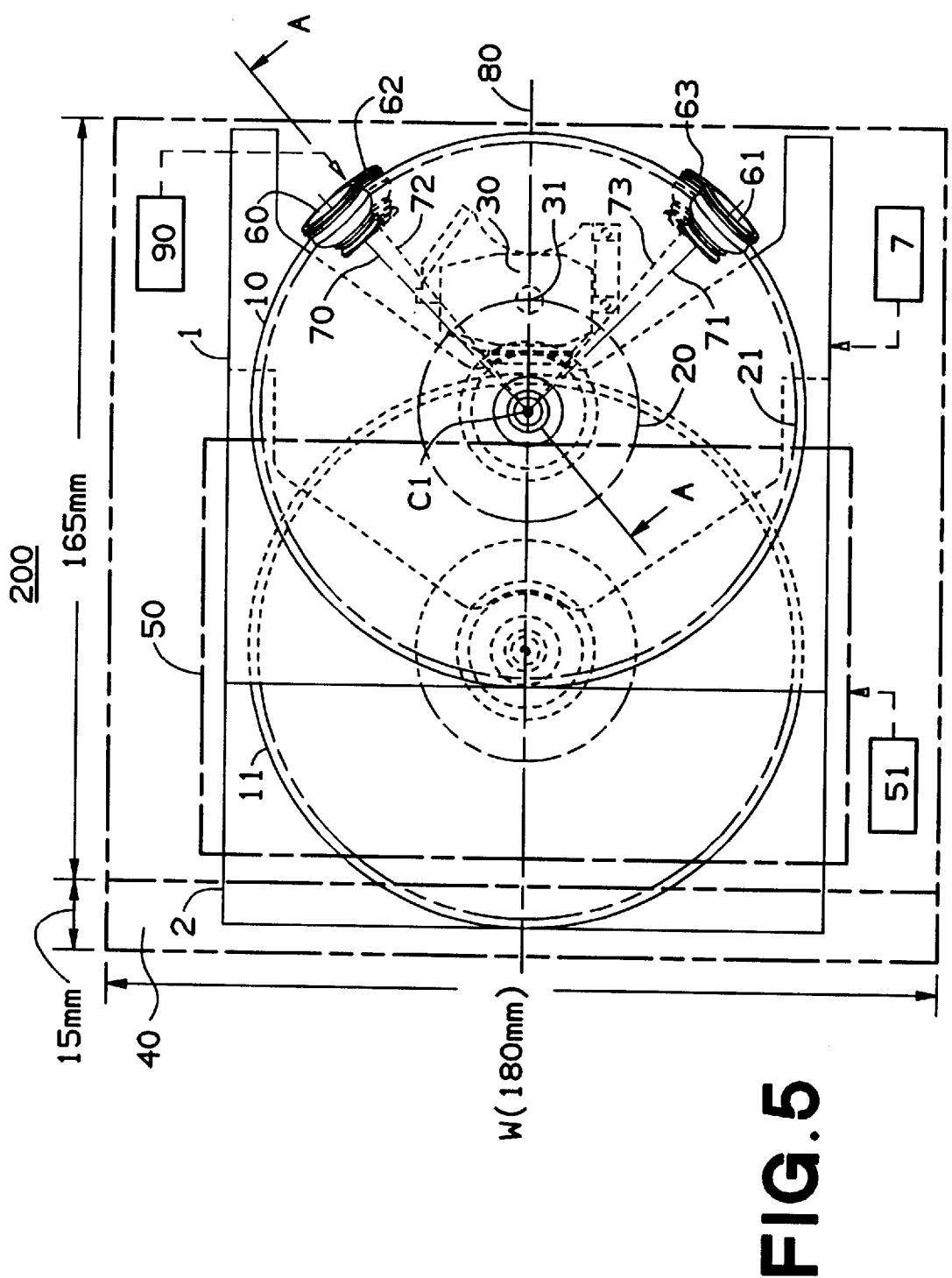
FIG. 5 is a plan view of the disk changer of FIG. 1 showing the selected carriage in a playback starting position.
Figure 6:
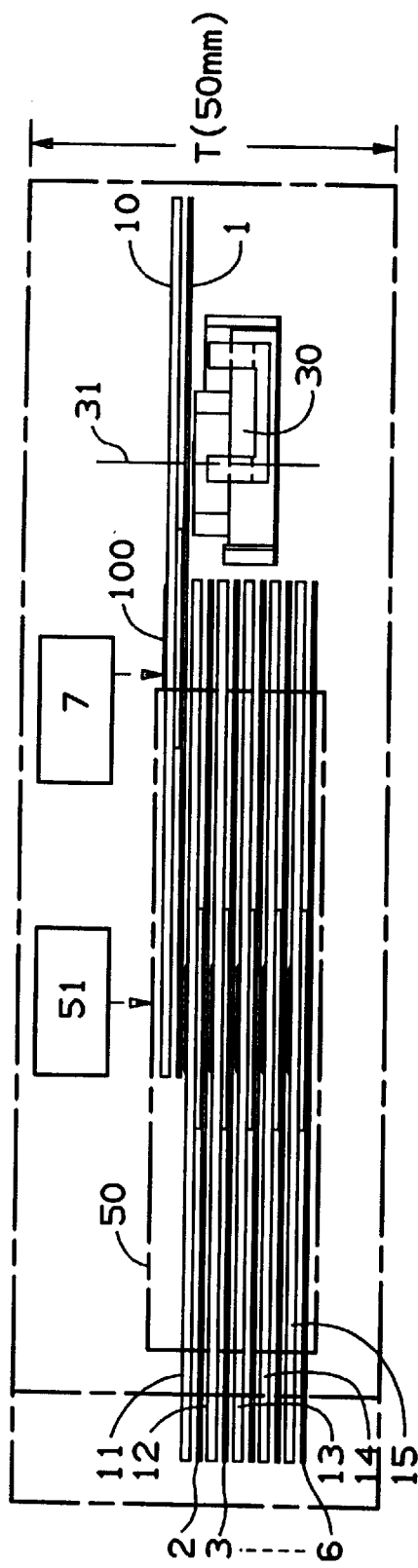
FIG. 6 is a side view of the disk changer of FIG. 1 showing the selected carriage in a playback starting position.

Referring to FIGS. 5 and 6, the first carriage 1 and disk 10 are shown moved from a stowed position in the magazine 50, past the playback finishing position, to the playback starting position. The carriage moving mechanism moves the recorded media of the selected disk travels over the optical head 30. Alignment of the first carriage 1 at the playback starting position places the innermost perimeter 20 of recorded medium of the first disk 10 in line with the axis 31 of a light beam of the optical head 30. Reading of a disk is initiated at the playback starting position. The axis 31 of the optical head 30 tracks a radial line 80 on the selected disk, extending in a radial direction of carriage motion. The center line 80 passes through the center of the disk so the circumferential track direction of the light beam does not change in response to the relative position of the optical head 30 and the selected carriage.

Figure 7:
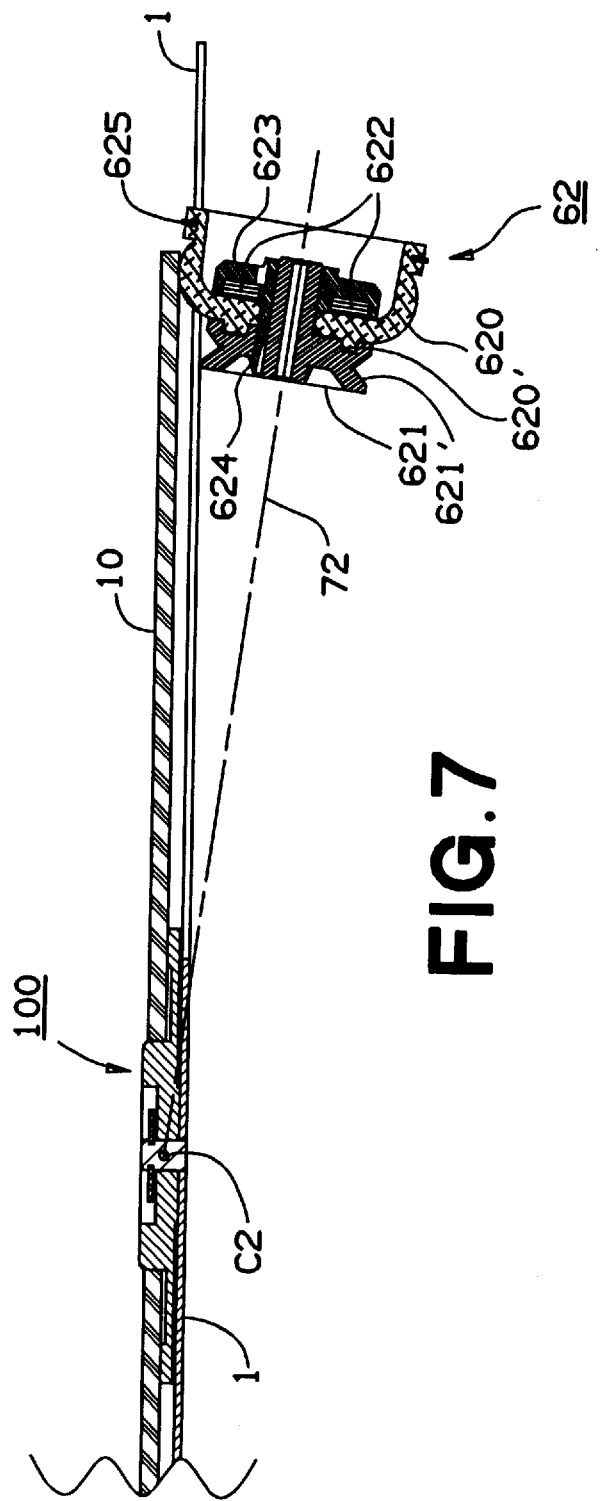
FIG. 7 is a cross-sectional view of an embodiment of a roller configuration of the present invention.

Referring to FIGS. 3 and 7, the first disk 10 is engaged by the four rollers, 60–63, at the playback finishing position. The rollers 60–63 each have an axis of rotation intersecting a disk center of their respective sides of the selected disk. The first and second rollers 60, 61 engage the upper surface of the first disk 10 (the label surface) and have rotation axes 70, 71 which align with center C1 of the upper surface of the first disk 10. The third and fourth rollers, 62 and 63, have rotation axes, 72 and 73, which align with center C2 of the lower surface of the first disk 10. For instance, the third roller 62 has an axis intersecting a center point C2 in the plane of the lower surface of the first disk 10 in FIG. 7. This orientation of the axes allows the four rollers 60–63 to rotate without rubbing against the disk, thus preventing damage to the paint on the label or the protective surface on the recording surface of the first disk 10. The third roller 62, which is the drive roller, engages the data readout surface of the first disk 10 to effect smooth disk rotation without being affected by unevenness of the printing on the surface of the label side.

Figure 8A:
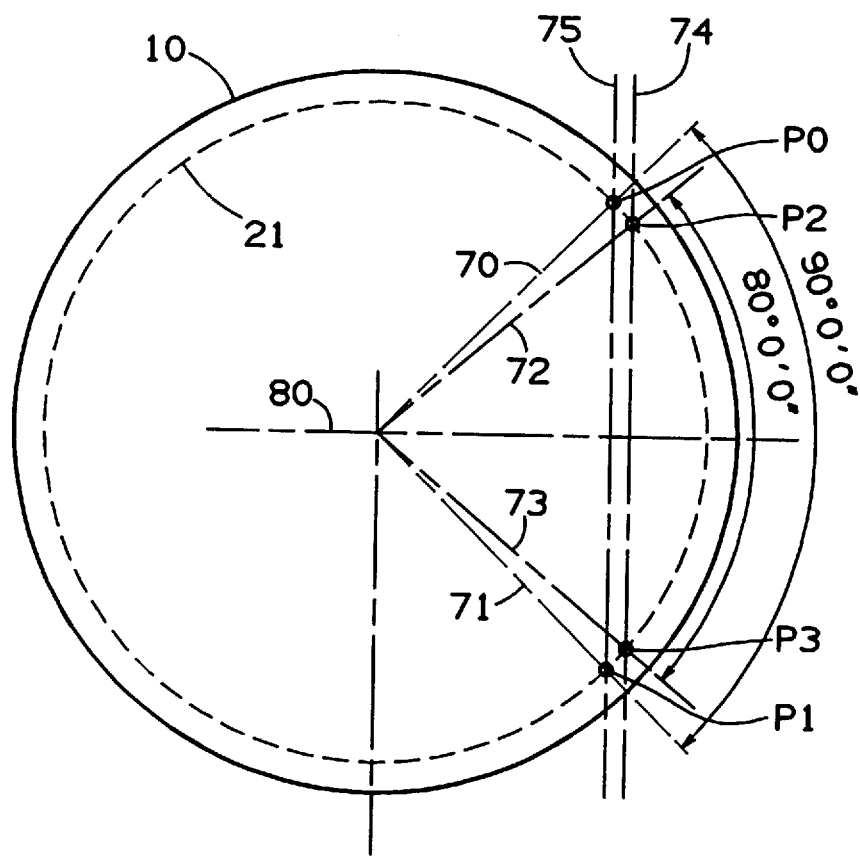
FIG. 8a is a plan view of a disk showing contact positions of rollers of the present invention.
Figure 8B:
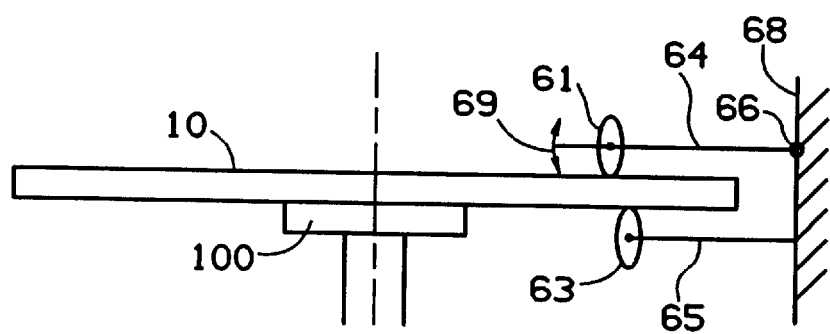
FIG. 8b is a side view simplified drawing of an embodiment of a disk drive mechanism of the present invention.

Referring to FIGS. 8a and 8b, the first and second rollers, 60 and 61 (not shown in FIG. 8a), are positioned relative to center line 80 so as to place their respective rotation axes, 70 and 71, at a 90 degree angle to each other. The first and second rollers, 60 and 61, are movably mounted via an arm 64 connected to a frame 68 by a pivotal mount 66 to allow slight vertical movements depicted by arcuate arrows 69. The first and second rollers, 60 and 61, and are biased downward by a spring (not shown) toward the upper surface of the first disk 10. The third and fourth rollers, 62 and 63, engage the lower surface of the first disk 10 and are fixedly connected in the vertical direction to the frame 68 by a support member 65. Thus, the four rollers 60–63 engage the first disk 10 by opposing forces at four contact points P0–P3 along a common radial circumference 21'. Further details of roller mounting and driving are omitted as they are realizable by those of ordinary skill in the art in view of the present disclosure. It is further realizable that the positioning of the fixed and biasing rollers may be interchanged and that the choice of the drive roller may be varied.

The third and fourth rollers, 62 and 63, are positioned to place their respective contact points, P2 and P3, slightly more inward toward the center line 80 than the first and second rollers, 60 and 61. In a preferred embodiment, the first and second axes, 70 and 71, form a 90 degree angle while the third and fourth axes, 72 and 73, form an 80 degree angle. Thus, the contact points, P2 and P3, of the third and fourth rollers, 62 and 63, define a first line 74 intersecting the center line 80 further from the center of the first disk 10 than a second line 75 defined by contact points P0 and P1 of the first and second rollers, 60 and 61. The bias force of the first and second rollers, 60 and 61, thus serves to bias the center of the disk 100 downward against the turntable 100 while the third and fourth roller, 62 and 63, serve as pivots.

The engagement of the four rollers 60–63 with the first disk 10 and the turntable 100 provides a stable support for a portion of the first disk 10 above the optical head 30. The turntable 100 and the third and fourth rollers, 62 and 63, form a three point support plane. The first and second rollers, 60 and 61, maintain a bias upon the first disk 10 to stably maintain a triangular portion of the first disk 10, defined by the disk center and first and second rollers 60 and 61. The triangular portion is outlined by the first and second axes, 70 and 71. This configuration effectively limits vibrations and resonances of a disk within the triangular portion. As a result, a required range of a focus servo signal sent to the optical head 100 is reduced, contributing to an improvement in sound quality.

It is realized that alternative biasing methods may be employed in constructing the present invention. For instance, rollers may be aligned along equal and coinciding angular segments of the first disk 10 while being positioned at slightly different radial distances from the center of the first selected disk 10. In such an arrangement, the top rollers would have a shorter radial axis than the bottom rollers to bias the center of the first disk 10 toward the turntable 100. Furthermore, alternative embodiments of the present invention include a disk changer having one of the above described biasing configurations wherein the first disk 10 rotates in a fixed position and the optical head is movable with respect to the chassis and selected disk.

Referring again to FIG. 7, details of the third roller 62 are shown as representative of the construction of each of the four rollers 60–63. A rubber wheel 620 has a cup structure with an annular ring projection 620' which is held between first and second hub members 621 and 623. An elastic material 622 is compressed between the second hub member 623 and the rubber wheel 620 to press the annular ring projection 620' into a corresponding recess of the first hub member 621. A pulley 621' is integrally formed in the first hub member by an annular groove. The third roller 62 has a belt coupling the pulley 621 to the drive source 90 to rotate the first disk 10. Three pawl hooks 624 (one of which is visible) extend from the second hub member 623 through notches in the first hub member 621 to lock the first and second hub members, 621 and 623, together. The pawl hooks are formed at 120 degree intervals as projections of the second hub member 623. A ring 625 is formed on the rim of rubber roller 620.

The ring 625 is formed of a material which is harder than the material of the rubber wheel 620 in order to prevent deformation of the rubber wheel 620 during rotation.

Referring now to FIGS. 3, 5, and 8*b*, the four rollers 160–163, and their associated drive source 90, move in conjunction with the selected carriage in the range between the playback finishing position and the playback starting position. After the first disk 10 and carriage 1 are moved out of the magazine 50, the first disk 10 initially engages the four rollers 60–63 at the playback finishing position. The first disk 10 displaces the spring biased first and second rollers, 60 and 61, as the first disk 100 is inserted between the first and second rollers, 60 and 61, and third and fourth rollers, 62 and 63. Once the rollers 60–63 are engaged, the frame 68 and drive source 90 couple with the selected carriage and move in conjunction therewith. When the four rollers 60–63 are not engaged with a selected disk they remain in their respective playback finishing positions. Various mechanisms are employable to effect the coupling and the carriage moving mechanism 7. The details of such mechanisms are realizable by those of ordinary skill in the art in view of this disclosure and as such are omitted.

Alternative embodiments of the present invention include disk drive configurations wherein the four roller 60–63 are disposed at angular positions other than those discussed above. Such positions need only be sufficient to apply an appropriate bias to the selected disk and stabilize the region scanned by the optical head 30. Furthermore, the number of rollers may be reduced from four to three functioning in conjunction with the turntable 100 wherein only a single idler roller is used to apply a downward bias in place of the first and second rollers, 61 and 62, described above. The single idler roller would apply downward pressure at a point between the third and fourth rollers and radially inward thereof.

Other embodiments include roller configurations wherein a selected disk is supported by a least three edge rollers engaging an edge of the selected disk. The edge rollers include a groove for engaging the disk edge and are positionable so that the disk is supported by the three rollers. The groove is preferably of a V-notch configuration to effect self-centering of the disk edge in the groove. One such embodiment includes first and second idler edge rollers mounted at exit corners of a magazine and biased towards each other to apply pressure against the selected disk. Opposing the first and second edge rollers is a third edge roller engaging the edge of the selected disk. The third roller is driven by a drive mechanism to rotate the selected disk.

In another alternative embodiment, each carriage may include the pair of edge rollers. It is further realized that each carriage may carry a single edge roller centrally positioned along a side of the carriage furthest from the optical head. In such a configuration, movement of the carriage brings the selected disk into contact with a pair of edge rollers positioned substantially in conformance with the positions of the first and second rollers, 60 and 61, in FIG. 3. Carriage mounted edge rollers allow use of a fixed optical head while the magazine mounted edge rollers are preferably used with a traveling optical head. Each configuration rotatably supports the selected disk at three points thus providing stable operation. The turntable 100 may thus be eliminated.

Alternatively, a belt drive is realizable by disposing a belt in contact with the edge of the selected disk above an optical head to effect rotation thereof. Either a turntable or opposing edge rollers are disposed to further support the selected disk during rotation. Furthermore, the belt may be formed to incorporate a V-notch groove for centering as discussed above with respect to the edge rollers. The belt mechanism may be moved in conjunction with the selected disk during scanning to effect rotation. Alternatively, the belt mechanism may extend a length of a path of travel of the selected disk and maintain contact with the selected disk during scanning to rotate the selected disk.

The increased stability provided by the present invention is equally applicable to a conventional direct or belt drive turntable device. A pair of edge rollers biased toward a selected disk or the four rollers 60–63 described above operate as idler rollers and may be used in conjunction with a conventionally driven turntable to effect greater stability during operation.

Such a configuration provides for greater stability, however, sacrifices the clearance afforded by the idler turntable configuration described above. As discussed above, the three points of support provide a triangular region of stability for the optical head to scan.

While the above drive configurations are discussed herein with application to a disk changer, they are equally applicable to disk players without magazines or disk transport mechanisms wherein a user places a disk directly upon the turntable or rollers of the disk drive mechanism. Application of such alternative drive configurations may be realized by those of ordinary skill in the art having viewed the present disclosure and are considered to be within the scope and spirit of the present invention.

Figure 9:
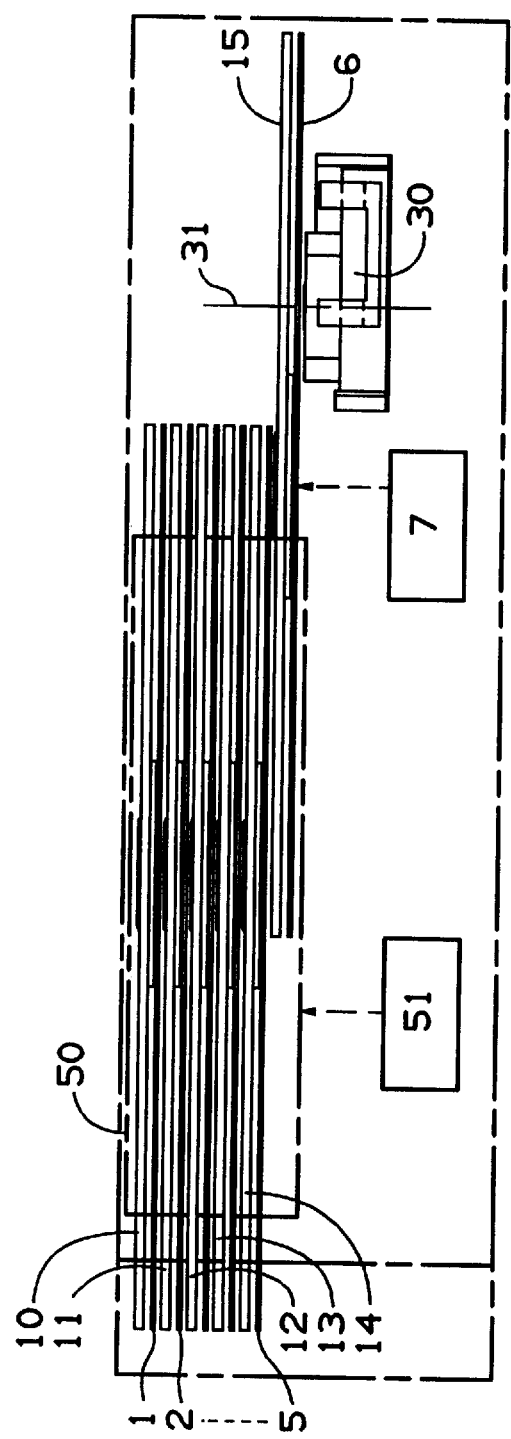
FIG. 9 is a side view of the disk changer of FIG. 1 showing a lowermost carriage selected and in a playback starting position.

Referring to FIGS. 6 and 9, the magazine 50 is shown in lowermost and uppermost positions, respectively, illustrating operation of the vertical drive mechanism 51. In order to select one of the carriages 1–6, magazine 50 is moved vertically by the vertical drive mechanism 51 to one of six positions whereat a selected carriage aligns with the carriage moving mechanism 7. In FIG. 6, the magazine 50 is in a position wherein the uppermost first carriage 1 is selected. In contrast, in FIG. 9, the magazine 50 is positioned to select the lowermost sixth carriage 6. The magazine positions in FIGS. 6 and 9 represent the extremes of the range of travel over which the magazine moving mechanism 7 operates. While the present embodiment incorporates a moving mechanism which moves the magazine 50 relative to the chassis and optical head 30, a mechanism for moving the optical head 30 relative to the chassis and the magazine 50 is realizable by those skilled in the art and considered to be within the scope and spirit of the present invention.

Figure 10:
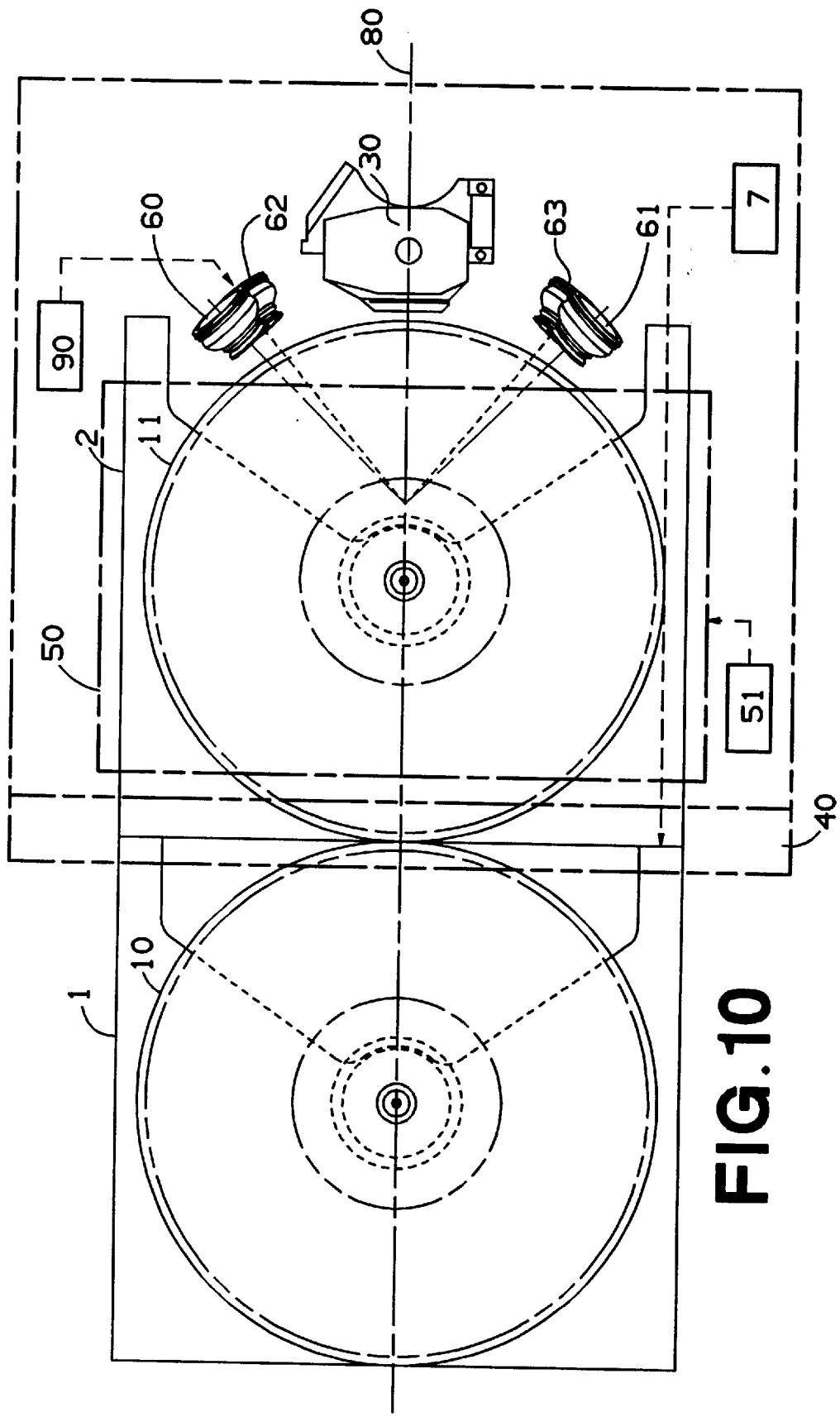
FIG. 10 is a plan view of the disk changer of FIG. 1 showing the uppermost carriage in an eject position.
Figure 11:
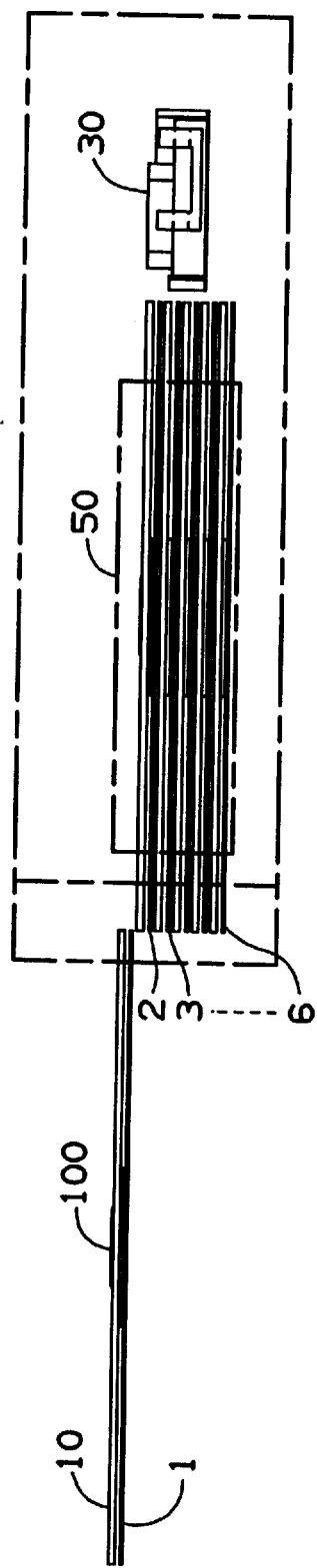
FIG. 11 is a side view of the disk changer of FIG. 1 showing the uppermost carriage in an eject position.

Referring to FIGS. 10 and 11, the selected carriage 1 is at an eject position, outside of the chassis, where disks can be removed and inserted. The plane of the eject position is coincident with the functional plane of the optical head 30 within which the selected disk 1 is moved when being read. Thus, the carriage moving mechanism 7 need only operate within a single plane in the present embodiment permitting efficiency of operation. Alternatively, removal of a carriage to an eject position need not necessarily be coplanar with the functional plane of the disk reader. Finally, an embodiment is realizable wherein an eject function ejects the entire magazine 50 to a position where it may be removed and manually loaded and unloaded. Each ejection configuration is adaptable to use with the disk reading configuration described above wherein the selected disk is moved over the optical head 30 which is fixed in position.

Referring again to FIGS. 1 and 2, operation of the disk changer 200 includes a stop mode wherein all the carriages 1–6 are stowed in the magazine 50. The disk changer 200 has a plurality of front panel controls (not shown) used to initiate various modes of operation. If an eject key is actuated while the disk changer 200 is in the stop mode as shown, the selected carriage, in this example the first carriage 1, is moved by the carriage moving mechanism 7 to the eject position as shown in FIGS. 10 and 11. At the eject position, it is possible to insert or remove a disk into or from the first carriage.

While in the eject mode, if a disk select key (not shown) for a disk other than the selected disk is pressed, e.g. a selection key for the sixth disk 15, the first carriage 1 is returned to the holding position within the magazine 50. During the transfer of the first carriage 1 back to the holding position in the magazine 50, the presence or absence of a disk on the first carriage 1 is detected by an optical sensor (not shown). The status of each of the carriages 1–6 is thus stored in memory when a given carriage is returned from the eject position. The magazine 50 is then moved upward to select the sixth carriage 6. The selected sixth carriage 6 is then transferred to the eject position. The data indicating the status of whether the sixth carriage 6 holds as disk is then cleared.

While in the stop mode of FIGS. 1 and 2, actuation of a playback key initiates the transfer of the presently selected carriage to the playback beginning position of FIGS. 5 and 6. The selected carriage, which is the first carriage 1 in the present example, is first moved to the playback finishing position shown in FIGS. 3 and 4 where the first disk 10 engages the rollers 60–63. The third roller 62 is driven by the drive source 90 to rotate the first disk 10 in a clock-wise direction. Rotation of the first disk simultaneously rotates the idler rollers 60, 61 and 63. The rotation of third roller 62 is controlled so that it rotates at a prescribed initial speed except during the actual playback of the selected disk. Thus, the selected disk rotates clockwise during the movement of the select carriage. When the selected carriage 1 moves to the playback finishing position, shown in FIG. 3, the rotation axes of the rollers 60–63 are aligned with the disk center, as described above. The relative positioning of the rollers 60–63 with the selected disk is then maintain by movement of the rollers 60–63 in conjunction with the selected carriage.

A detector (not shown) detects the presence of the selected carriage at the playback starting position. Once the selected carriage is detected at the playback starting position, a servo control is engaged to enable the focus servo, the tracking servo, and similar functions know to those of ordinary skill in the art and therefore not detailed herein. A feed error signal detects track alignment with the optical head light beam. The feed error signal is sent to a drive motor (not shown) of the carriage moving means 7 to maintain proper alignment of the optical head 30 with tracks on the selected disk during playback. During disk playback, the selected carriage is moved gradually toward the front of the disk changer 200 in conjunction with the rollers 60–63, aligning the light beam of the optical head 30 with the information tracks. A CLV servo signal is sent to the drive source 90, and the speed of rotation for roller 62 is controlled so that the linear velocity of a track currently being read always remains constant.

After disk playback is complete or when the stop button is pressed, the servo control stops and the drive roller 62 once again rotates at the prescribed initial speed. Following the completion of disk playback, the selected carriage is moved from the playback finishing position shown in FIGS. 3 and 4, to the holding position shown in FIGS. 1 and 2 while the rollers 60–63 remain at their playback finishing positions.

The disk changer 200 may optionally operate in a continuous serial play mode. In such a mode, where playback of the first disk 10 is completed as described above, the magazine 50 is moved to select the second carriage 2 if the status of the second carriage 2 in the memory indicates a disk is held thereon. Playback of the second disk 11 is then initiated.

Referring to FIGS. 10 and 11 showing the positioning in the eject mode, actuation of the playback key during the eject mode results in the first carriage 1 being transported to the rear of the disk changer 200. If a disk is detected on the first carriage 1, the first carriage is transported to the disk playback beginning position shown in FIGS. 5 and 6 and playback is begun. Alternatively, if a disk is not detected the first carriage 1 is brought to the holding position. Then, a carriage is selected which contains a disk and the disk playback operation is begun.

The features of the present invention thus overcome drawbacks inherent in the prior art. The present invention provides a disk changer wherein the need for a drive mechanism for moving an optical head is eliminated. The position of the optical head 30 is fixed and the carriage moving mechanism 7 performs the functions of both disk transport between the eject, holding, and playback beginning positions, and the relative displacement between the optical head 30 and the selected disk for the purpose of optical scanning. Thus, the need for independent mechanism for disk transport and optical scanning is eliminated allowing for simplification in design and construction of the disk changer 200 and a reduction in size.

Furthermore, the four rollers 60–63 function in conjunction with the turntable 100 of the selected carriage to provide stable operation. The triangular segment of the selected disk, defined by the turntable 100 and the third and fourth rollers 62 and 63, is effectively stabilized allowing increased fidelity to be achieved by a corresponding reduction in the required range of the focus servo.

Still further, the four rollers 60–63 of the present invention engage the selected disk along a perimeter surface outside of the label and recorded medium areas. Prior art devices engage a selected disk with rollers traversing the recorded medium and label resulting in damage thereto. Such damage produces reading errors and distortion in audio output in addition to marring the appearance of the disk. Thus, the construction of the disk changer presented herein eliminates such disadvantageous effects.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disk reader comprising:

a chassis;

a disk reading head for scanning information recorded on a disk;

transport means for transporting said disk relative to said chassis from a read starting position to a read ending position, situated relative to said disk reading head, during scanning of said information, whereby said disk reading head remains stationary with respect to said chassis and said disk transport mechanism moves said disk relative to said chassis to read said disk during said scanning of said information;

disk drive means for rotating said disk during scanning by said disk reading head;

said disk drive means including an idler turntable for engaging a center aperture of said disk permitting said disk to rotate about said center aperture; and said disk drive means including means for rotating said disk by engaging said disk at a fixed circumferential area on a first flat surface of said disk remote from said idler turntable.

2. The disk reader of claim 1 further comprising means for fixedly mounting said disk reading head to said chassis with respect to a scanning direction.

3. The disk reader of claim 1 further comprising means for coupling said disk drive means with said transport means to permit rotation of said disk during scanning transport.

4. The disk reader of claim 3 further comprising a carriage for holding said disk during scanning and said carriage including said idler turntable for rotatably supporting said disk.

5. The disk reader of claim 4 wherein said transport means includes means for transporting said disk and carriage between said read starting position and an access position for loading and unloading said disk.

6. The disk reader of claim 4 wherein said disk drive means includes means for rotatably supporting said disk at three points of contact defining a triangle within a plane of said disk to effect stabilization of said disk within a region of said triangle.

7. The disk reader of claim 1 wherein said transport means includes means for transporting said disk between said read starting position and an access position for loading and unloading said disk.

8. A disk reader comprising:

a chassis;

a disk reading head for reading information recorded on a disk;

means for mounting said disk reading head to said chassis fixedly with respect to a scanning direction;

transport means for transporting said disk from an access position for loading and unloading to a read starting position situated relative to said disk reading head;

disk drive means for rotating said disk during scanning by said disk reading head;

said disk drive means including an idler turntable for engaging a center aperture of said disk permitting rotation of said disk about said center aperture;

said disk drive means including means for applying a rotating force to said disk by engaging said disk along a fixed circumferential area;

said transport means including means for simultaneously transporting both said disk and said disk drive means from said read starting position to a read ending position during scanning such that said disk and said disk drive means do not move relative to each other during scanning; and a disk reading position being located between said read starting position and said read ending position;

said transport means engaging said disk in a functional plane of said disk reading head past said disk reading position during scanning by said disk reading head, whereby said disk reading head remains stationary with respect to said chassis and said disk transport mechanism moves said disk relative to said chassis to read said disk during said scanning.

9. The disk reader of claim 1 wherein said means for applying comprises:

first and second rollers for rotatably engaging said disk at first and second contact areas respectively, along an outer perimeter of said disk;

means for rotating at least one of said first and second rollers, such that said disk rotates about said center aperture.

10. The disk reader of claim 9 wherein said disk drive means further comprises:

said first and second contact areas being located on a first flat surface of said disk;

at least a third roller for rotatably engaging an opposing second flat surface of said disk; and means for biasing said at least a third roller against said second flat surface to assert pressure on said idler turntable and said first and second rollers.

11. The disk reader of claim 10 wherein said disk drive means further comprises:

said first and second rollers defining a first angle therebetween with respect to a center of said disk;

a fourth roller for rotatably engaging said opposing second flat surface of said disk;

said idler turntable engaging said center aperture from a direction of said first flat surface;

said third and fourth rollers defining a second angle therebetween with respect to a center of said disk;

said second angle being greater than said first angle such that said disk is biased toward said idler turntable.

12. The disk reader of claim 10 wherein said disk drive means further comprises:

a fourth roller for rotatably engaging said opposing second flat surface of said disk;

said idler turntable engaging said center aperture from a direction of said first flat surface; and means for disposing said third and fourth rollers radially inward from said first and second rollers such that said disk is biased toward said idler turntable.

13. The disk reader of claim 10 wherein said first and second rollers each have rotational axes intersecting a center of said disk on respective contact surfaces.

14. A disk reader comprising:

a disk reading head for reading information recorded on a disk;

means for effecting a relative scanning of said disk reading head across said disk;

disk drive means for rotating said disk including first and second rollers for rotatably engaging said disk while said disk reading head reads said information at first and second contact areas respectively, along a fixed circumferential area on a first flat surface of said disk, and an idler turntable for engaging a center aperture of said disk permitting said disk to rotate about said center aperture;

means for rotating at least one of said first roller and said second roller, such that said disk rotates about said center aperture;

means for biasing said disk to assert pressure on said idler turntable and said first and second rollers; and said means for effecting a relative scanning including a transporting mechanism simultaneously transporting both said disk and said disk drive means past said first and second contact areas between a read start position, where said disk reading head is located at a beginning of information on said disk, and a read end position, where said disk reading head is located at an end of information on said disk, during rotation of said disk by said disk drive means, whereby said disk reading head remains stationary during said relative scanning and said disk transporting mechanism moves said disk under said disk reading head to read said disk during said relative scanning.

15. The disk reader of claim 14 wherein said disk drive means further comprises:

said first and second contact areas being located on a first flat surface of said disk;

at least a third roller for rotatably engaging an opposing second flat surface of said disk; and said means for biasing including means for applying a bias on said at least a third roller toward said second flat surface to assert pressure on said idler turntable and said first and second rollers.

16. The disk reader of claim 15 wherein said disk drive means further comprises:

said first and second rollers defining a first angle therebetween with respect to a center of said disk;

a fourth roller for rotatably engaging said opposing second flat surface of said disk;

said idler turntable engaging said center aperture from a direction of said first flat surface;

said third and fourth rollers defining a second angle therebetween with respect to a center of said disk;

said second angle being greater than said first angle such that said disk is biased toward said idler turntable.

17. The disk reader of claim 15 wherein said disk drive means further comprises:

a fourth roller for rotatably engaging said opposing second flat surface of said disk;

said idler turntable engaging said center aperture from a direction of said first flat surface; and means for disposing said third and fourth rollers radially inward from said first and second rollers to bias said disk toward said idler turntable.

18. The disk reader of claim 15 wherein said first and second rollers each have rotational axes intersecting a center of said disk on respective contact surfaces.

19. A disk reader comprising:

a disk reading head for reading information recorded on a disk;

means for relative scanning of said disk reading head across said disk;

disk drive means for rotating said disk;

said disk drive means including means for rotatably supporting said disk at three points of contact defining a triangle within a plane of said disk to effect stabilization of said disk within a region of said triangle while said disk reading head reads said information recorded on a disk;

said disk reading head being within said region said triangle;

means for biasing said disk toward said means for rotatably supporting;

said means for relative scanning including a disk transport mechanism, said disk transport mechanism transporting said disk and said disk drive means simultaneously past a disk reading position between a read starting position and a read ending position during said relative scanning, where by said disk reading head remains stationary with respect to said chassis and said disk transport mechanism moves said disk relative to said chassis to read said disk during said relative scanning.

20. The disk reader of claim 19 wherein said disk drive means includes first and second rollers for rotatably engaging said disk at first and second contact areas respectively, along a fixed circumferential area on a first flat surface of said disk, and a turntable for engaging a center aperture of said disk permitting said disk to rotate about said center aperture.

21. The disk reader of claim 20 wherein said first and second rollers each have rotational axes intersecting a center of said disk on respective contact surfaces.

22. The disk reader of claim 20 wherein said first and second contact areas being located on a first flat surface of said disk, at least a third roller for rotatably engaging a second flat surface of said disk, and said means for biasing includes means for pressing said third roller against said second flat surface to assert pressure on said turntable and said first and second rollers.

23. The disk reader of claim 20 wherein said disk drive means further comprises:

said first and second rollers defining a first angle therebetween with respect to a center of said disk;

a fourth roller for rotatably engaging a second flat surface of said disk, opposing said first flat surface;

said turntable being an idler turntable engaging said center aperture from a direction of said first flat surface;

said third and fourth rollers defining a second angle therebetween with respect to said center of said disk;

said second angle being greater than said first angle such that said disk is biased toward said idler turntable.

24. A disk reader comprising:

a chassis;

a disk reading head for reading information recorded on a disk;

a carriage for carrying said disk;

transport means for transporting said disk and carriage relative to said chassis;

said carriage including an idler turntable upon which said disk is rotatably supported;

disk drive means for rotating said disk in continuous engagement with a fixed circumferential area on a first flat surface of said disk during scanning to rotate said disk upon said idler turntable; and said transport means including means for simultaneously transporting said disk and said disk drive means during scanning from a read starting position to a read ending position such that said disk reading head remains stationary with respect to said chassis during scanning.

25. The disk reader of claim 24 wherein said transport means further includes means for extending transport of said disk and carriage between a read ending position and an access position for loading and unloading said disk.

26. The disk reader of claim 24 wherein said transport means engages said disk in a functional plane of said disk reading head to permit reading said information.

27. The disk reader of claim 26 further comprising means for mounting said disk reading head in said chassis at a fixed position in planes parallel to a plane of said disk,.

28. The disk reader of claim 24 wherein:

said disk drive means includes means for rotatably supporting said disk at three points of contact defining a triangle within a plane of said disk to effect stabilization of said disk within a region of said triangle;

said idler turntable defining one of said three points of contact; and means for biasing said disk toward said means for rotatably supporting.

29. The disk reader of claim 28 wherein said means for rotatably supporting includes at least two edge rollers engaging said disk at two of said three points of contact along a perimeter edge of said disk.

30. The disk reader of claim 28 wherein:

said means for rotatably supporting includes first and second rollers for rotatably engaging said disk at first and second contact areas defined by a fixed circumferential area on a first flat surface of said disk;

said disk drive means includes at least a third roller for rotatably engaging a second flat surface of said disk; and said means for biasing includes means for pressing said third roller against said second flat surface to assert disk pressure on said rotatable support and said first and second rollers.

31. The disk reader of claim 30 further comprising:

said first and second rollers means defining a first angle therebetween with respect to a center of said disk;

a fourth roller for rotatably engaging said opposing second flat surface of said disk;

said idler turntable engaging said center aperture from a direction of said first flat surface;

said third and fourth rollers defining a second angle therebetween with respect to a center of said disk; and said second angle being greater than said first angle such that said disk is biased toward said idler turntable.

32. A disk player comprising:

a magazine for storing disks;

a disk reading head for reading information recorded on said disks;

disk drive means for rotating a disk during said reading;

said disk drive means including an idler turntable engaging a center aperture of said disk permitting rotation of said disk about said center aperture;

said disk drive means including means for applying a rotating force to a first flat surface of said disk to rotate said disk upon said idler turntable;

means for effecting relative movement between said magazine and said disk reading head to select said disk from said disks stored in said magazine; and transport means for transporting said disk between a holding position in said magazine and a read starting position, situated relative to said disk reading head, permitting scanning of said information by movement of said disk relative to said disk reading head;

said transport means including means for simultaneously transporting said disk and said disk drive means past a disk reading position during scanning from said read starting position to a read ending position such that said disk and said disk drive means do not move relative to each other during scanning, and said disk reading head remains stationary during said scanning.

33. The disk player according to claim 32 further comprising:

carriages;

each of said carriages having said idler turntable for rotatably supporting one of said disks thereon; and said magazine including means for accepting said carriages in said holding positions.

34. The disk player according to claim 33 further comprising said transport means including means for engaging said disk drive means to transport said disk drive means in tandem with a selected carriage and said disk during said reading of said disk.

35. The disk player according to claim 33 further comprising said disk reading head having a sensing portion fixed a predetermined distance in a radial direction from said disks in said magazine to allow scanning of an innermost circumference of a recording surface of said disk while a center aperture of said disk overlaps said disks in said magazine.

36. The disk player according to claim 35, wherein said transport means includes means for extending transport of said disk from said holding position in said magazine to an access position for loading and unloading.

37. The disk player according to claim 35 further comprising means for mounting said disk reading head in said chassis at a fixed position in planes parallel to a plane of said disk.

38. The disk player according to claim 32 further comprising:

said disk drive means including means for rotatably supporting said disk at three points of contact defining a triangle within a plane of said disk to effect stabilization of said disk within a region of said triangle; and said idler turntable being one of said three points of contact;

means for biasing said disk toward said means for rotatably supporting.

39. The disk player according to claim 38 wherein:

said means for rotatably supporting includes first and second rollers for rotatably engaging said disk at first and second contact areas defined by a fixed circumferential area on a first flat surface of said disk;

said disk drive means includes at least a third roller for rotatably engaging a second flat surface of said disk and means for driving one of said first and second rollers to effect rotation of said disk; and said means for biasing includes means for pressing said third roller against said second flat surface to assert disk pressure on said rotatable support and said first and second rollers.

40. The disk player according to claim 32 further comprising said transport means including means for engaging said disk drive means to transport said disk drive means in tandem with said disk during scanning of said disk by said disk reading head.

41. The disk player according to claim 32 further comprising said disk reading head having a sensing portion fixed a predetermined distance in a radial direction from said disks in said magazine such that an innermost circumference of a recording surface of said disk is scanable while a center aperture of said disk overlaps said disks in said magazine.

42. A disk player comprising:

a magazine for storing disks;

a disk reading head for reading information recorded on a disk selected from said disks;

means for effecting relative scanning of said disk by said disk reading head;

disk drive means for rotating a disk during scanning by said disk reading head;

said disk drive means having an idler turntable engaging a center aperture of said disk and a means for rotating engaging an outer perimeter of a first flat surface of said disk;

transport means for transporting said disk between a holding position in said magazine and a read starting position;

means for moving said magazine relative to said disk reading head to select said disk from said disks stored in said magazine;

said disk reading head having a sensing portion for scanning an innermost circumference of a recording surface of said disk while a center aperture of said disk overlaps said disks in said magazine;

said means for effecting relative scanning including said transport means wherein said transport means further includes means for simultaneously transporting both said disk and said disk driving means past a disk reading position being from said read starting position to a read ending position where said sensing portion is aligned with an outermost circumference of said recording surface of said disk, whereby said reading head remains stationary, and said disk is moved relative to said reading head by said transport means during said scanning of said disk.

43. The disk player of claim 42 comprising means for fixing said disk reading head a predetermined distance in a radial direction from said disks in said magazine permitting said sensing portion to scan said innermost circumference while said center aperture overlaps disks in said magazine.

44. A disk player comprising:

a chassis;

a disk reading head for reading information recorded on a disk;

means for mounting said disk reading head to said chassis fixedly with respect to a scanning direction;

transport means for transporting said disk from an access position for loading and unloading to a read starting position, where an innermost perimeter of said disk is situated in a position relative to said disk reading head;

disk drive means including an idler turntable engaging a center aperture of said disk permitting rotation of said disk about said center aperture said disk drive means also including means for rotating said disk during reading by engaging a circumferential area of said disk; and said transporting means including means for simultaneously transporting said disk and said disk drive means past a disk reading position being between said read starting position and a read finishing position, where an outermost perimeter of said disk is situated in said position relative to said disk reading head, effective to engage said disk in a functional plane of said disk reading head during scanning by said disk reading head, whereby said disk reading head remains stationary with respect to said chassis and said disk transport mechanism moves said disk relative to said chassis to read said disk during said scanning.

45. The disk player of claim 44 wherein said means for rotating comprises:

first and second rollers for rotatably engaging said disk at first and second contact areas respectively, along in outer perimeter of said disk; and means for rotating at least one of said first and second rollers, such that said disk rotates about said center aperture.

46. The disk player of claim 45 wherein said means for rotating further comprises:

said first and second contact areas being located on a first flat surface of said disk;

at least a third roller for rotatably engaging an opposing second flat surface of said disk; and means for biasing said at least a third roller against said second flat surface to assert pressure on said idler turntable and said first and second rollers.

47. The disk player of claim 46 wherein said disk drive means further comprises:

said first and second rollers defining a first angle therebetween with respect to a center of said disk;

a fourth roller for rotatably engaging said opposing second flat surface of said disk;

said idler turntable engaging said center aperture from a direction of said first flat surface;

said third and fourth rollers defining a second angle therebetween with respect to a center of said disk;

said second angle being greater than said first angle such that said disk is biased toward said idler turntable.

48. The disk player of claim 46 wherein said disk drive means further comprises:

a fourth roller for rotatably engaging said opposing second flat surface of said disk;

said idler turntable engaging said center aperture from a direction of said first flat surface; and means for disposing said third and fourth rollers radially inward from said first and second rollers such that said disk is biased toward said idler turntable.

49. The disk player of claim 46 wherein said first and second rollers each have rotational axes intersecting a center of said disk on respective contact surfaces.

50. A disk reader for reading information recorded on a disk, comprising:

a chassis;

a disk reading head, fixedly mounted on said chassis;

a transporter movably mounted in said chassis;

said transporter being movable between an access position and a read starting position;

a disk drive movably connected to said chassis;

said disk drive being rotatably engageable with a disk on said transporter;

said transporter being in engagement with said disk drive when said transporter is in a range from said read starting position to a read finish position, wherein said transporter moves with said disk and said disk drive past a disk reading position between a read starting position and a read finish position while said disk is rotated by said disk drive and said disk reading head in a substantially stationary position reads information recorded on said disk; and said transporter being disengaged from said disk drive when said transporter is without said range.

51. The disk reader of claim 50 wherein said disk drive includes:

at least one upper roller and at least two lower rollers movably connected to said chassis;

said at least one upper roller and said at least two lower rollers being rotatably engageable with an upper surface and a lower surface of said disk on said transporter, respectively;

a roller drive mechanism rotatably connected to one of said at least one upper roller and said at least two lower rollers, wherein said disk on said transporter rotates when said disk is engaged with said at least one upper roller and said at least two lower rollers and when said roller drive mechanism rotates.

52. The disk reader of claim 50 wherein said disk drive includes:

two lower rollers and two upper rollers connected to said chassis;

said two upper rollers and said two lower rollers being rotatably engageable with an upper surface and a lower surface of said disk on said transporter, respectively;

a roller drive mechanism rotatably connected to one of said two upper rollers and said two lower rollers, wherein said disk on said transporter rotates when said disk is engaged with said two upper rollers and said two lower rollers and when said roller drive mechanism rotates.

53. The disk reader of claim 52, further including:

an idler turntable on said transporter engaging a center aperture of said disk on said transporter;

said two upper rollers defining a first angle therebetween with respect to a center of said disk;

said two lower rollers defining a second angle therebetween with respect to said center of said disk;

said second angle being greater than said first angle.

54. The disk reader of claim 52, wherein said two upper rollers are positioned radially inward from said two lower rollers with respect to said disk on said transporter.

55. The disk reader of claim 52, wherein an axis of rotation of each of said two upper rollers and said two lower rollers intersects a center of said disk on said transporter when said disk drive engages said disk.

56. A disk changer for playing back a disk, said disk having an innermost circumference of a recording surface and an outermost circumference of said recording surface, comprising:

a chassis;

a magazine for storing disks;

a disk reading head being connected to said chassis adjacent a first outer perimeter of a disk while said disk is stored in said magazine;

said disk reading head having a light-source axis and a second outer perimeter;

a transport mechanism engageable with said disk and having a range of transport such as to transport said disk from a stored position in said magazine to a reading position in which said light-source axis is aligned with an outer portion of said recording surface substantially at said outermost circumference;

said disk reading head being positioned such that a distance along a radius of said disk stored in said magazine between a portion of said second perimeter adjacent said disk stored in said magazine and said light-source axis is substantially equal to a distance between said outer portion while said disk is stored in said magazine and said outer portion while said disk is reading position, said range of said transport mechanism being sufficient to permit said disk to be moved such that said light-source axis coincides with an entirety of said recording surface, whereby said disk is read by said disk reading head when said disk is rotated while being transported past said reading position, said disk reading head being fixed on said chassis in a substantially stationary position while said disk is read, whereby a dimension along said radius required to play said disk and accommodate said disk reading head and said disk stored in said magazine, is minimized.

57. A disk changer as in claim 56, wherein said disk transport mechanism includes a rotating support with a motor drive engageable with said disk allowing said disk to be rotated as said disk is transported.

58. A disk changer for playing back a disk, said disk having an innermost circumference of a recording surface and an outermost circumference of said recording surface, comprising:

a chassis;

a magazine for storing disks;

a disk reading head being connected to said chassis adjacent an outer perimeter of a disk while said disk is stored in said magazine;

said disk reading head having a light-source axis;

a transport mechanism engageable with said disk and having a range of transport such as to transport said disk from a stored position in said magazine to a first reading position in which said light-source axis is aligned with an inner portion of said recording surface substantially at said innermost circumference and to transport said disk, while said disk is rotatable, from said first reading position to a second reading position in which said light-source axis is aligned with an outer portion of said recording surface substanitially at said outermost circumference, whereby said disk is read by said disk reading head;

said disk reading head remains in a substantially stationary position while said disk is read in a disk reading position;

said disk reading position being between said first reading position and said second reading position;

said disk reading head being entirely located beneath said disk in a range, along a radius of said disk while said disk is in said magazine, spanning between an outermost edge of said disk when said disk is in said magazine and an outermost edge of said disk when said disk is in said second reading position;

said disk transport mechanism moves said disk past said disk reading position, whereby a dimension along said radius required to play said disk and accommodate said disk reading head and said disk stored in said magazine, is minimized.

59. A disk changer as in claim 58, wherein said disk transport mechanism includes a rotating support with a motor drive engageable with said disk allowing said disk to be rotated as said disk is transported.

* * * * *